Inventor
Harold L. Smith

Aug. 4, 1942.   H. L. SMITH   2,292,167
INDUCTION MOTOR
Filed July 20, 1940   2 Sheets-Sheet 2

Inventor
Harold L. Smith

Patented Aug. 4, 1942

2,292,167

UNITED STATES PATENT OFFICE 2,292,167

INDUCTION MOTOR

Harold L. Smith, Milwaukee, Wis., assignor to The Louis Allis Company, Milwaukee, Wis., a corporation of Wisconsin Application July 20, 1940, Serial No. 346,507

10 Claims. (Cl. 172—120)

This invention relates to induction motors and has as an object the provision of a motor having low starting current and high starting torque characteristics accompanied by low slip at full load.

Double squirrel cage rotors long have been known to improve these characteristics in induction motors; but even with the double cage construction, much was left to be desired unless special high resistance metal was employed for the top or outer bars of the rotor.

The use of dissimilar metals for the outer and inner bars of the rotor enables the proper apportionment of resistance and reactance to meet given requirements; but obviously, this expedient is very impractical where the secondary winding is formed as a casting.

This invention, therefore, proposes an improvement in double squirrel cage rotors by which the resistance and reactance of the top bars of a rotor may be respectively increased and decreased to the desired extent without sacrificing the cast secondary winding with its desirable ruggedness and economy.

More specifically, it is an object of this invention to provide a practical manner of utilizing the known fact that the resistance of the top bars of a secondary winding can be increased directly with the length thereof and inversely with their cross sectional area, to the end that specifications now impossible to meet in constructions involving cast secondary windings can be met.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which.

Figure 1:
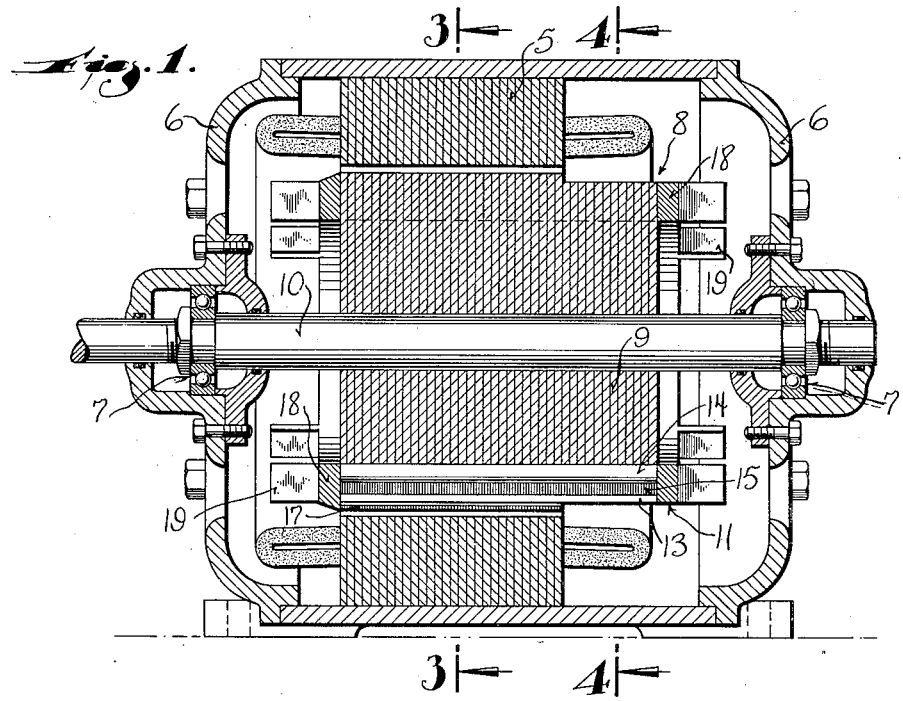
Figure 1 is a longitudinal sectional view through an electric motor constructed in accordance with this invention.
Figure 2:
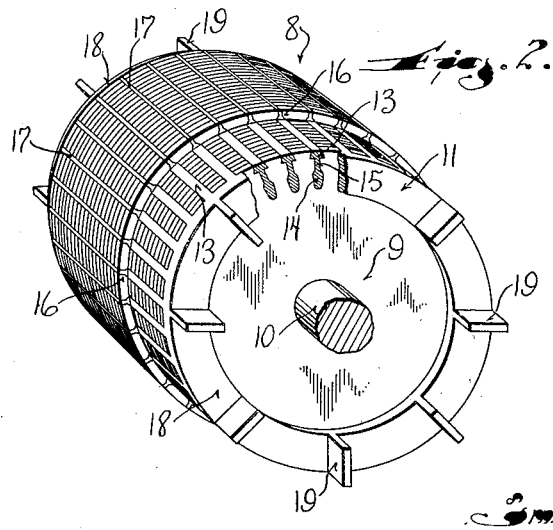
Figure 2 is a perspective view of the rotor per se with a part of the secondary winding broken away and in section.
Figure 3:
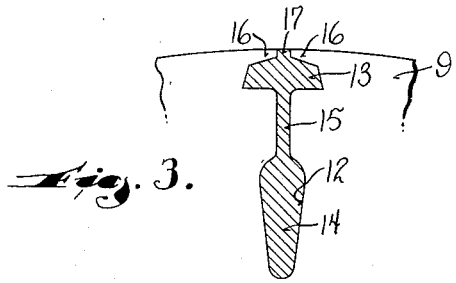
Figure 3 is an enlarged cross sectional view taken through the rotor on the plane of the line 3—3 in Figure 1 and illustrating the normal cross section of the bars.

Referring now particularly to the accompanying drawings, in which like numerals indicate like parts, the numeral 5 designates a conventional stator core provided with polyphase windings and having a length determined by the output required. The stator core is mounted in the customary housing which includes end bells 6, each of which is equipped with a bearing 7 to mount the rotor, indicated generally by the numeral 8.

The rotor consists of a core 9 composed of a stack of laminations assembled on the rotor shaft 10, and a cast winding designated generally by the numeral 11.

Figure 5:
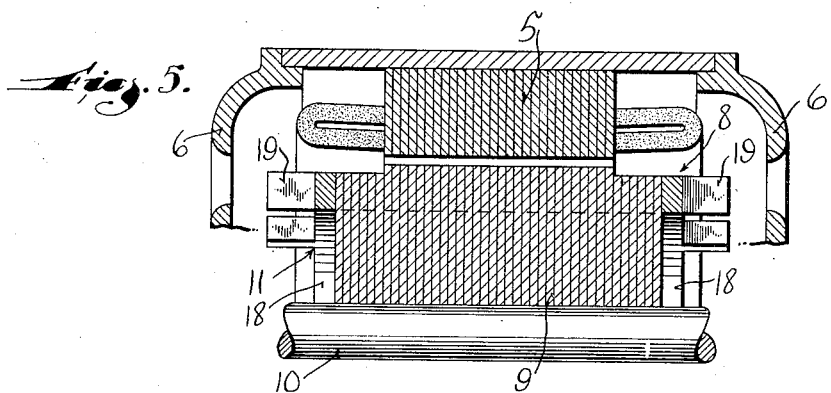
Figure 5 is a longitudinal sectional view showing part of a motor and illustrating a slightly modified embodiment of the invention.
Figure 6:
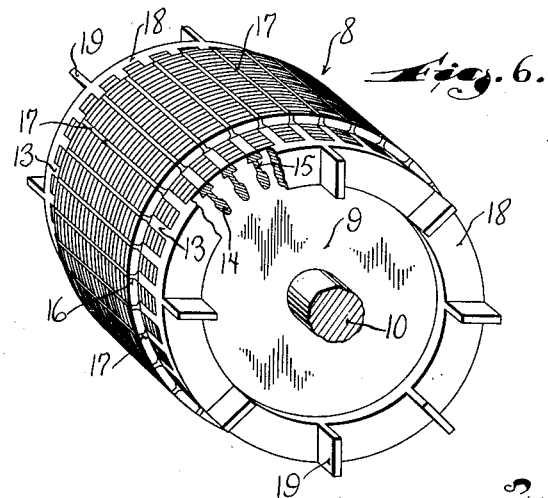
Figure 6 is a perspective view similar to Figure 2 and showing the rotor employed in the modification illustrated in Figure 5.

For a purpose to be hereinafter more fully described, the rotor has a greater core length than the stator. Consequently, the rotor core overhangs or extends beyond the stator core at one end, as shown in Figure 1, or at both ends, as shown in Figure 5. In each instance, this increased rotor core length is utilized in a novel manner to give the rotor low starting current and high torque characteristics accompanied by low slip at full load. These desirable attributes are derived from the novel shape of the rotor winding bars now about to be described.

Each lamina of the rotor core is stamped by the same punch and has a plurality of slots 12 in its peripheral portion. In assembling the rotor, the laminae are properly oriented with the slots in line, spiraled or not, as desired, and then the rotor winding is cast in place. It is to be understood that a suitable mold is used in the casting operation.

The shape of the slots 12 is such that top and bottom bars 13 and 14, respectively, are formed. The narrow slit which connects the outer and inner portions of each slot, may or may not fill with molten metal during castings so that the top and bottom bars may be connected by a thin web 15. The presence or absence of this thin web is of no consequence.

Attention is now particularly directed to the specific cross sectional shape and location of the top bar 13 with relation to the peripheral surface of the rotor. Inasmuch as all of the laminae are stamped by one punch, it follows that they have the same diameter and that the top bars have the same cross sectional shape throughout their length at the completion of the casting operation.

The shape of the slots which form the top bars leaves overhanging inwardly directed core portions 16 which extend over the top bar and which are spaced apart to leave a rather narrow slit which is filled by a rib 17 on the outer face of the top bar. This rib is generally referred to as the "tip" of the top bar.

It is of course to be understood that the narrow slit or throat of the slot is not required. In other words, the slot need not open to the periphery of the core.

After the casting operation, that part of the rotor core which extends beyond the stator core is turned down so that the projecting portion of the rotor core has a reduced diameter. As a consequence of this reduction in the diameter of the projecting portion or portions of the rotor core, the overhanging portions 16 are cut away and the top bars are exposed for a considerable part of their total width.

Figure 4:
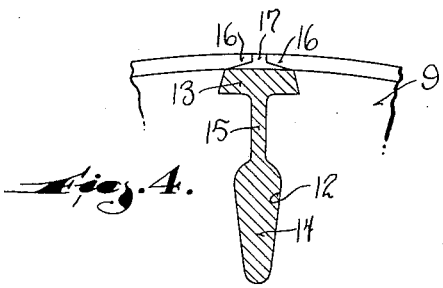
Figure 4 is a similar cross sectional view taken through Figure 1 on the plane of the line 4—4 to show the cross sectional shape of the bars in a portion of the rotor which extends beyond the stator.

If desired the entirety of overhanging core portions 16 may be cut away as illustrated in Figure 4, whereupon the full width of the top bar is exposed, the slight reentrant angle of the sides of the slot portion in which the main body of the top bar is seated being provided merely to hold the bar against displacement by centrifugal force.

It is to be observed, however, that the increased length of the core amply surrounds the reduced bar sections where the diameter is reduced, with a considerable volume of laminated steel, in intimate contact with the cast bars, so that the high concentration of heat loss in this bar is readily conducted to the colder laminated steel; thus insuring safe bar temperatures.

Through the expedient of turning down the extending portion of the rotor in this manner, a high resistance low reactance top bar is produced. This follows from the fact that the resistance of any cage winding increases directly with the length of the bar and inversely as its cross sectional area is reduced.

Those skilled in the art know that casting practice presents a practical limit to the amount the slot which forms the top bar can be reduced and still have the molten metal flow. The minimum size to which the top bar can be cast is insufficient to increase the resistance the amount desired.

Hence, lengthening of the bar and subsequent reduction of the cross sectional area of that portion of the bar which extends beyond the stator core presents an exceptionally facile manner of increasing the top bar resistance and at the same time the top bar heat dissipation.

While it may be desirable to form the step in the diameter of the rotor in the manner described, i. e., by turning down part of its core, it is, of course, possible to use different diameter laminations. In that event the smaller laminations could be formed by punching pre-cut or blanked discs of the desired diameter, with the same punch that forms the slots in the main laminations.

In any event, the rotor core may be considered as consisting of a main stack of laminations (that part of the rotor core within the stator core) and an auxiliary stack of discs or laminations (the smaller ones which form the projecting end portion or portions).

Also it is to be understood that where the rotor core is built up of different diameter laminations, the molding form must be correspondingly stepped.

Reduction in the diameter of the extended part of the core also has the advantage of decreasing the reactance of the extended portion of the core below what it would be if the reduction in diameter were not made. Thus in effect the top bar resistance is increased without a proportional increase in reactance.

Increasing the length of the rotor core also has an advantage with relation to the bottom bar. Inasmuch as the reactance of the lower bar is governed largely by the area of the web or space between the top and bottom bars, by increasing the length of the core and bars, it is possible to increase the reactance of the lower cage without increasing the radial dimension of the web or decreasing the circumferential dimensions of the lower slot tooth. In fact the lower cage bar section can be increased, thus counteracting the effect of the increased bar resistance due to increased bar length and permitting greater area for the lower bar without increasing the magnetic saturation of the core tooth.

The ends of the rotor bars are connected by end rings 18 in the customary manner, and these end rings may have fan blades 19 formed thereon.

From the foregoing description taken in connection with the accompanying drawings, it will be readily apparent to those skilled in the art that this invention provides an exceedingly simple manner of increasing the resistance of the top bars in the secondary winding of double squirrel cage induction motors without appreciably increasing the reactance, and also increasing the reactance of the bottom cage without entailing an increase in the radial length of the slot; and that these desirable advantages are achieved without sacrificing the economy and ruggedness of the cast type of construction.

What I claim as my invention is:

1. In an induction motor having a stator and rotor, each of which has a magnetic core: the rotor core being axially longer than the stator core so that a part thereof projects beyond the stator core, said rotor core having longitudinal slots adjacent to its periphery, any point on the bottom of each of which and extending linearly for the full length of the core is uniformly spaced from the axis of the rotor throughout the length of the core; and conductor bars in the slots, that part of the rotor core which projects beyond the stator core being reduced in diameter sufficiently to cut through the bars so that the cross sectional area of those portions of the conductor bars projecting beyond the stator core is less than that lying within the stator core.

2. In an induction motor having a stator and rotor, each of which has a magnetic core: the rotor core being axially longer than the stator core so that a part thereof projects beyond the stator core, said rotor core having longitudinal slots adjacent to its periphery; and conductor bars in the slots extending from end to end of the rotor core and having a smaller cross sectional area in that part of the rotor core which projects beyond the stator core than in the remainder thereof.

3. In an induction motor having a stator and rotor, each of which has a magnetic core: the rotor core being axially longer than the stator core so that a part thereof projects beyond the stator core, said rotor core having longitudinal slots adjacent to its periphery; and conductor bars in the slots extending from end to end of the rotor core and having a smaller cross sectional area in that part of the rotor core which projects beyond the stator core than in the remainder thereof, and said bars being widely exposed at the peripheral surface of that part of the rotor core which projects beyond the stator core.

4. The hereindescribed method of making a rotor for an induction motor designed to have low starting current and high starting torque characteristics which comprises: assemblying a stack of punched laminations having reentrant notches in their peripheries to form a magnetic core with the notches in line to provide longitudinal slots having restricted access to the periphery of the core, casting conductor bars into said slots; and turning down a portion of the core assembly to reduce the cross sectional area of the conductor bars for a portion of their length and to cut away the core portions overlying said portion of their length.

5. A rotor for electric motors comprising: a core having longitudinal slots spaced circumferentially about the rotor and each slot having radially spaced outer and inner portions connected by a narrow slit; and top and bottom windings cast into the slots and connected by end rings cast integral with the windings, said core having an end portion of reduced diameter in which the cross sectional area of the outer windings is substantially less than the cross sectional area of the outer windings in the remainder of the core.

6. In an induction motor, a rotor comprising: a laminated core having longitudinal slots adjacent to its periphery; and conductor bars in the slots extending from end to end of the rotor core, one portion of the rotor adjacent to one end thereof being cut down to reduce the diameter of the core and the cross sectional area of the conductor bars.

7. In an induction motor, a rotor comprising: a laminated core having longitudinal slots adjacent to its periphery; and conductor bars in the slots extending from end to end of the rotor core and having a smaller cross sectional area at one end portion of the rotor core than in the remainder thereof, said bars of smaller cross sectional area being widely exposed at the peripheral surface of said end portion of the rotor core.

8. In an induction motor, a rotor comprising: a core having all of its laminae provided with slots made with the same size punch and located close to the peripheries of the laminae, said core comprising a main section composed of a stack of disc-like laminae of uniform diameter, and an end section of disc-like laminae differing only from the main section laminae in diameter and shape of their slots at the periphery of the laminae, the end section laminae being reduced in diameter an extent such that the slots of the end section laminae have wide communication with the periphery of the core.

9. An induction motor secondary comprising: a stack of punched main discs of magnetic metal, each of which has circumferentially arranged peripheral slots shaped to form outer and inner portions connected by narrow slits, the outer portion being adjacent to the periphery of the disc and having a re-entrant shape which has greater circumferential width than radial depth; a stack of auxiliary punched discs of magnetic metal smaller in diameter than the main discs, said auxiliary discs having a like number of circumferentially arranged peripheral slots all of whose edges coincide with the edge portions of the slots of the main discs lying inside a circle the diameter of which is equal to the diameter of auxiliary discs; and a secondary winding including conductor bars in said slots, the portion of the conductor bars in the slots of the auxiliary discs having a smaller cross sectional area than those portions of the bars in the slots of the main discs.

10. The hereindescribed method of increasing the resistance and decreasing the reactance of the rotor winding of an induction motor which comprises: making the core of the rotor longer axially than the stator of the motor, reducing the diameter of the rotor for a portion of its length to thereby cut away part of the core material overhanging the winding bars and part of the bars to thereby reduce the cross sectional area of the bars and expose the bars for a substantial part of their width.

HAROLD L. SMITH.